INVENTOR.
JOSEPH LICHTENSTEIN
BY
ATTORNEYS

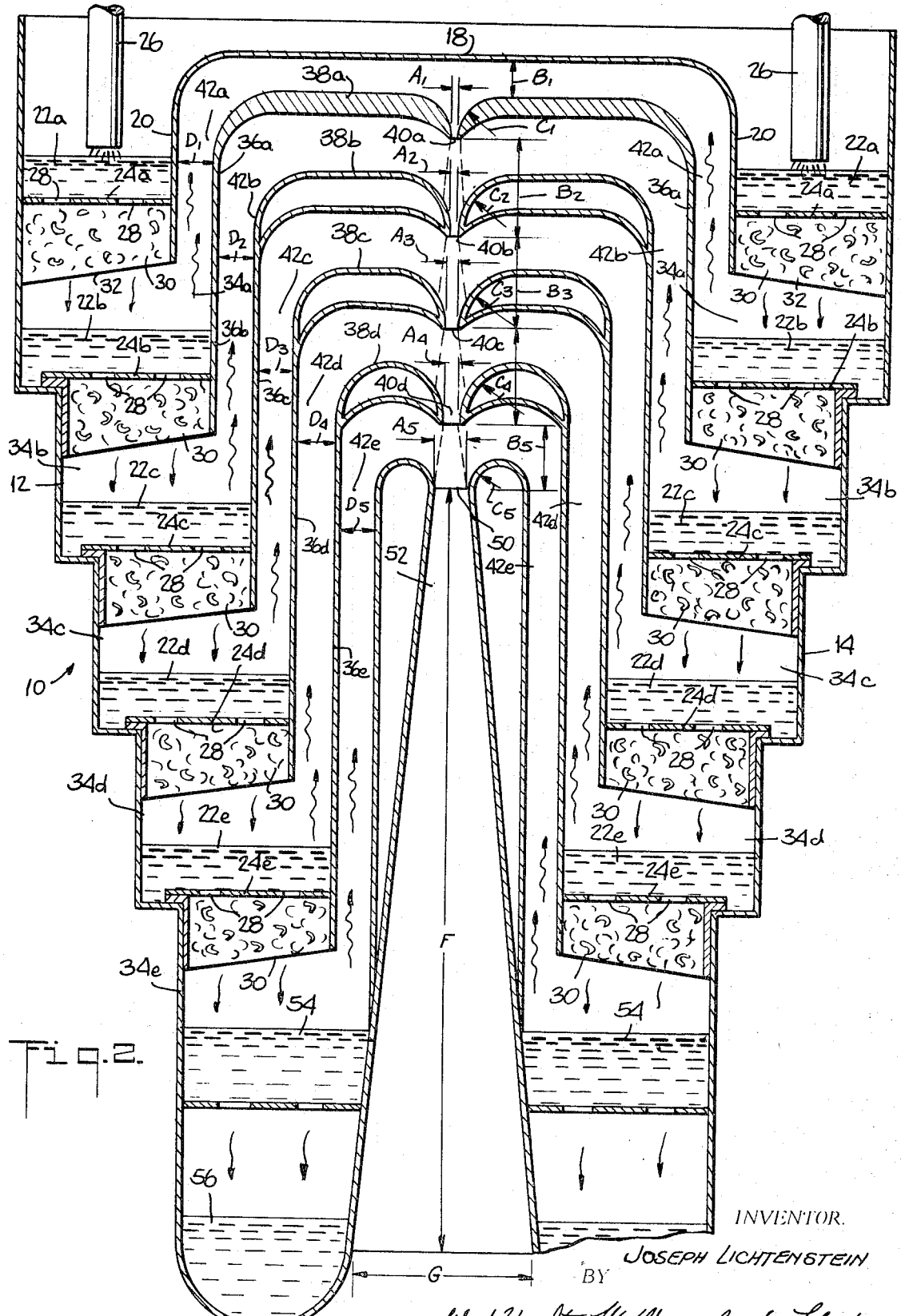

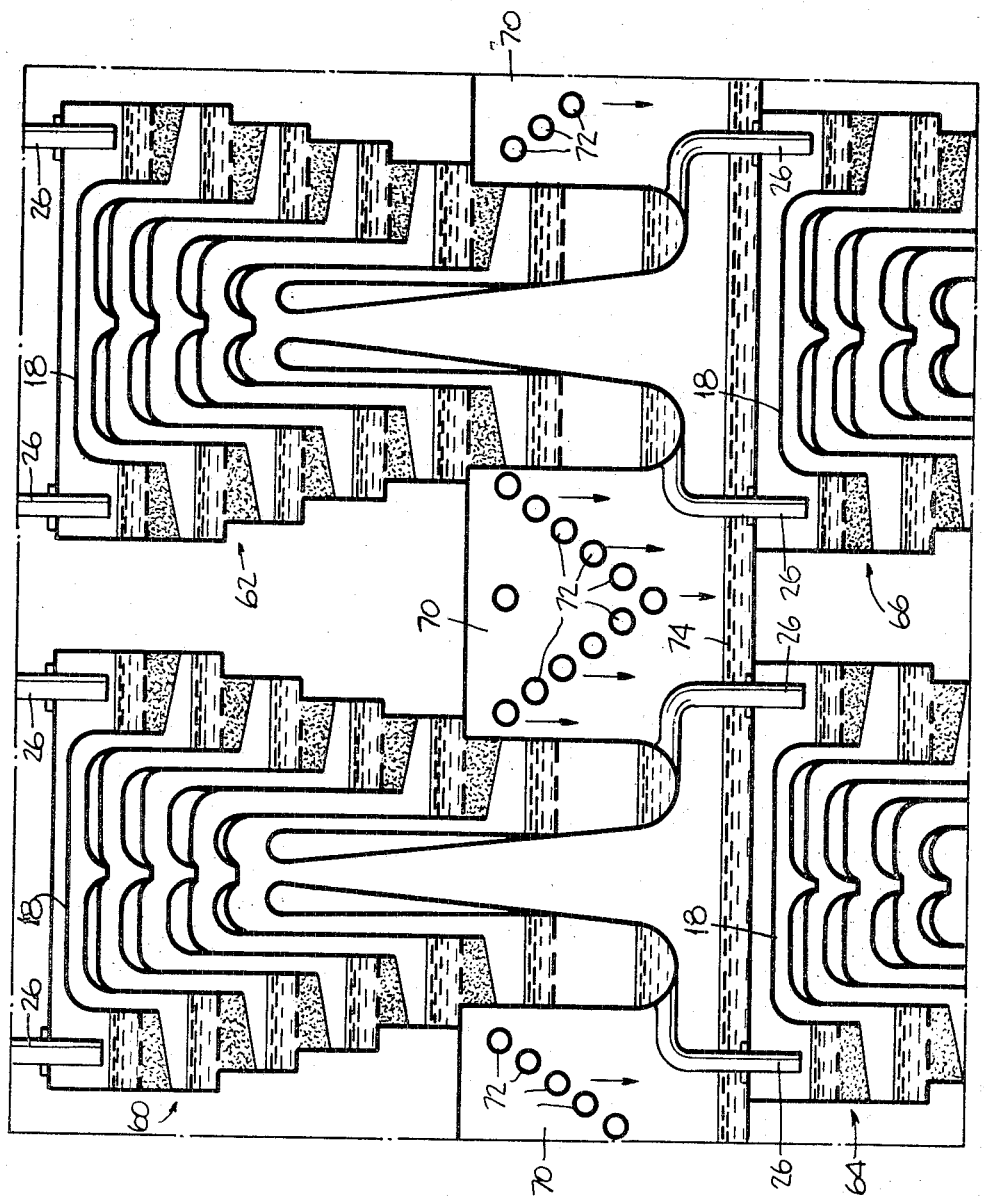

United States Patent Office 3,551,298
Patented Dec. 29, 1970

3,551,298
APPARATUS FOR COMBINING VAPORS
Joseph Lichtenstein, Bayside, N.Y., assignor to Saline Water Conversion Corporation, Oradell, N.J., a corporation of New York
Filed Dec. 11, 1967, Ser. No. 689,655
Int. Cl. B01d 3/06; C02b 1/06
U.S. Cl. 202—173                                                    6 Claims

ABSTRACT OF THE DISCLOSURE

An evaporative recovery system employing flash evaporation in finite multiple steps approaching thermodynamic reversibility. The respective vapor streams of each step are combined in a remote nozzle system which utilizes the respective pressure differentials between the respective steps to bring all the vapor streams to a common flow velocity in a common stream. The kinetic energy of the common stream thus obtained is recompressed in a diffusor into corresponding pressure for condensation.

---

This invention relates to the recovery of selected liquids from solution and more particularly it concerns improvements to evaporative type liquid recovery systems.

The present invention is especially useful in evaporative systems designed to recover salt free fresh water from sea water. Basically, vaporative recovery systems provide means for evaporating a portion of the incoming sea water, separating the vapors so formed and thereafter condensing these vapors to fresh water in liquid form.

Of the methods available to accomplish the above operation, the "flash" type of evaporation to-date is the predominant method employed. Such "flash" type evaporation is carried out by subjecting sea water at near saturation conditions to a reduced pressure. This produces evaporation of a portion of the water; and the heat of evaporation, which is obtained directly from the remaining unevaporated liquid, does not have to pass through vessel walls or other heat transfer barriers.

The realization of a flash, that is the cooling by evaporation of a liquid from an initial temperature to a lower end temperature can be carried out in a variety of ways, starting from the thermodynamically ideal process of complete reversibility to the more usual process of complete irreversibility. The reversible process requires that evaporation take place in an infinitely large number of small temperature steps, thus ensuring, by the resulting minute vapor release velocities, the production of a pure vapor. Even more significant, however, is the fact that in this process each incremental vapor element produced is at the pressure corresponding to its temperature and thus possesses an enthalpy potential in relation to the enthalpy at the end of the flash. By expansion, each vapor element can, therefore, be given a kinetic energy corresponding to its enthalpy potential.

It will be appreciated however, that the enthalpy potential for each successive incremental vapor element is different. Thus the first element, which vaporizes at the inlet temperature of the liquid, will possess the full enthalpy potential corresponding to the total flash, whereas the last element, vaporizing at the end temperature of the flash, will have none. Theoretical calculations show that the total vapor mass may be assumed to be concentrated at the middle temperature of the flash. Thus by expansion a kinetic energy is obtained which corresponds to the enthalpy potential from the middle to end of the flash.

The kinetic energy of the total mass of vapor can be reconverted into pressure in an ideal frictionless diffusor, and it will by such compression reach the middle temperature of the flash. In order for such compression to be effective, the vapor phase in the diffusor must be entirely separated from the liquid phase of evaporation. Otherwise the heat of recompression will result in the condensation of vapor on the colder liquid phase. Thus, for example, an ideal flash process proceeding from 100° to 90° would by recompression result in a vapor temperature of 95° at which temperature it could be condensed.

The irreversible process of flashing employed in prior art flash distillation is characterized by the fact that water at saturation pressure corresponding to its initial temperature is suddenly entered into a space of reduced pressure corresponding to the end temperature of the flash. The resulting violent flash produces the total vapor mass instantaneously at a saturation temperature corresponding to the end temperature of the flash. No enthalpy potential is available for recompression. The violence of the flash results in tearing off particles from the evaporating liquid, and creates a mist which is carried along by the produced vapors into the condenser, contaminating the final condensate with undesired salinity. To protect the product from too much contamination, demisters must be employed which offer resistance to the vapor flow and correspondingly further reduce its temperature. Thus, for example, such a flash proceeding from 100° to 90°, and with a demister loss of say 2°, would produce vapor in the condenser of a temperature of 88° as against 95° in the ideal process.

The above temperature difference if totally assigned to the terminal temperature difference of the condenser; the condenser surface required in an ideal flash process would be only a fraction of that which is required for conventional flash systems. On the other hand, if this temperature difference is assigned to the rise in condenser coolant temperature, a substantial reduction in heat required to maintain the flash cycle would result.

The present invention makes possible a flash type evaporation process which very closely approaches the ideal reversible process, and thereby overcomes the inefficiencies inherent in the flash systems previously utilized to-date. With the present invention, the energy contained within the flash is preserved with a high degree of efficiency so that the cost of producing fresh water by desalination is significantly reduced.

The actual realization of a flash process approaching that of the ideal reversible process is accomplished according to the present invention through the following steps.

First, the infinite number of temperature steps required by the ideal process is replaced by a finite number of steps. The total temperature differential of the flash is subdivided by a relatively small number of temperature steps.

Next, the vapor phase is physically separated from the liquid phase. This separation is accomplished in the present invention in a novel manner, that is, by poducing two entirely separate streams and connecting both by relatively large channels in which vapors produced in the first stream can flow at low velocity to join the second stream.

In the first stream brine flows through a series of cells, the number of which corresponds to the subdivision of temperature steps of the flash. The cells are separated from each other by resistance elements, producing required pressure differentials between successive cells and establishing in each cell the pressure required for evaporation to produce the vapors of the desired temperatures.

In the second stream the vapors produced in the evaporation cells, and flowing through the interconnecting channels are combined in the following manner.

First, the incoming brine is forced through the first resistance element and enters the first cell at a pressure fractionally lower than its saturation pressure. A certain amount of vapor is thus produced in the first cell. This vapor flows through its interconnecting channel to the first nozzle, which straddles the first and second cells. This vapor in passing through the nozzle is subjected to the pressure differential existing between these two cells. The vapor expands and obtains a kinetic energy corresponding to the existing pressure differential.

The vapor produced in the second cell is brought into contact, through its interconnecting channel, with the discharge of the first nozzle. By momentum exchange the two vapor streams mix and obtain a common but lower velocity than the discharge velocity of the first nozzle. The resulting mixture then expands through the second nozzle and obtains an increase in kinetic energy corresponding to the pressure differential existing between second and third cells. This process continues to the last nozzle, whose discharge is in contact, through its interconnecting channel, with the last cell. The vapor produced in the last cell mixes with the discharge of the last nozzle. The total vapor mass at this point is at maximum velocity. It then enters the diffusor.

In the diffusor, the kinetic energy of the total vapor mass is converted into pressure energy, so that at its discharge the vapor mass has reached its maximum pressure obtainable in the system and consequently can be condensed at its maximum temperature.

It will be appreciated that by the present invention, the vapors which are formed at different pressure and temperature in the various steps of a multistep evaporation system are efficiently condensed in a common condenser. This aspect of the invention involves the equalization of the thermodynamic energy or enthalpy of the vapors in the various stages, so that they may be intermingled in a common condenser region without violent effects. The equalization of enthalpy of the vapors is achieved with minimal energy loss by passing the high enthalpy vapors (those at higher temperatures and pressure) through nozzles which convert a portion of their thermodynamic energy or enthalpy to kinetic energy of flow. The resulting flow is directed in such a manner as to sweep along the vapors from the next lower stage. The combined vapors are thus eventually brought to a common flow and together may be further reduced in enthalpy and increased in flow to a next lower stage. Eventually, all the vapors come to a common velocity, temperature and pressure. The velocity energy is thereafter reconverted into increased temperature and pressure (i.e. increased thermodynamic energy or enthalpy) in a diffusor for more effective condensation in the condenser region.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A spceific embodiment of the invention has been chosen for purposes of illustration and description, and is shown in the accompanying drawings forming a part of the specification, wherein:

FIG. 2 is a section view taken along line 2—2 of FIG. 1; and

FIG. 3 is a view similar to FIG. 1 illustrating multiple and staging arrangements utilized in that system.

Figure 1:
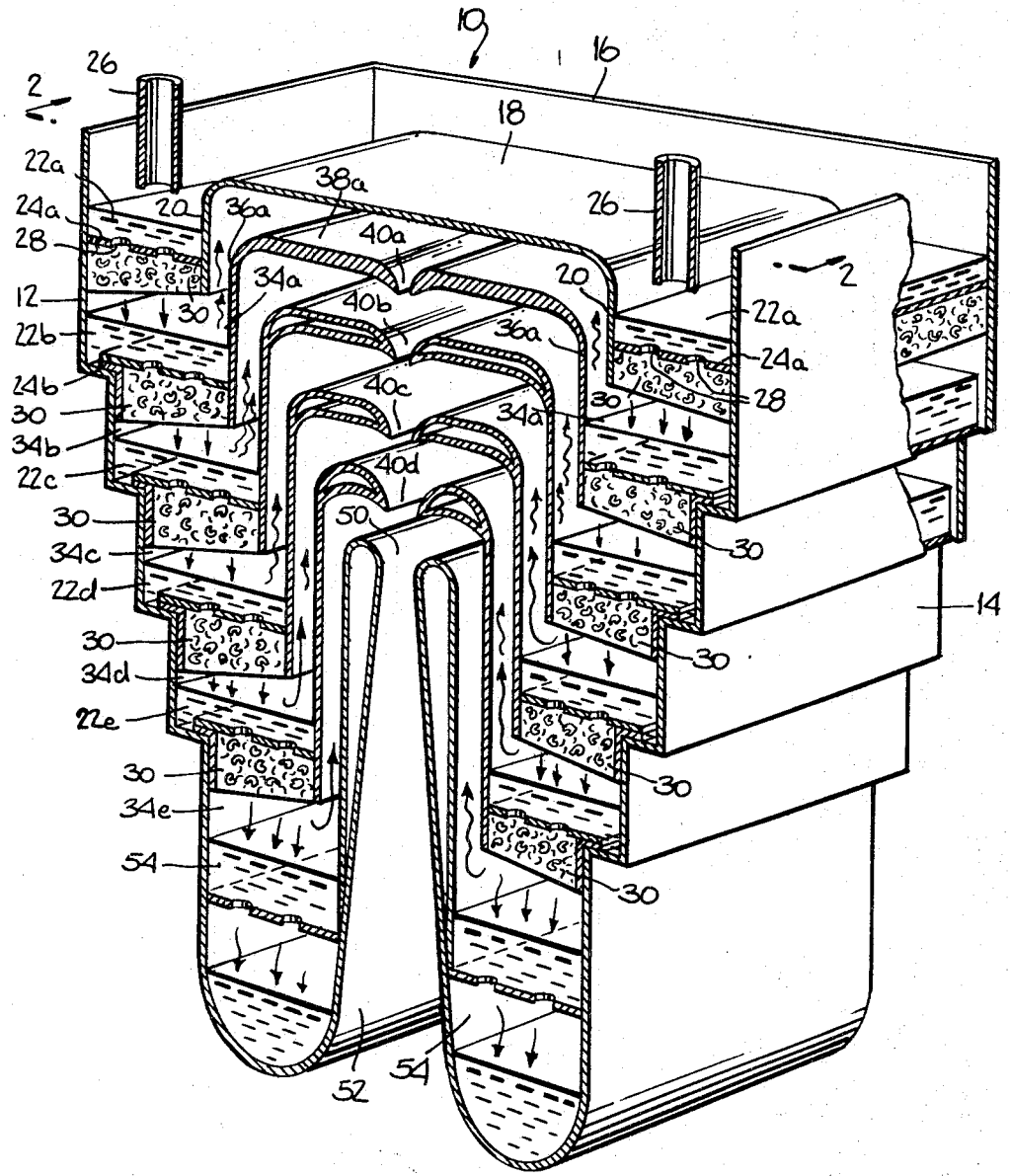
FIG. 1 is a perspective view, partially in section, of an evaporation and vapor separation stage of a system embodying the present invention.

As shown in FIGS. 1 and 2, the evaporation and vapor separation system is enclosed within an outer shell 10 which includes stepped upstanding side walls 12 and 14, a vertical rear wall 16 and a front wall (not shown). A horizontal cover plate 18 extends over the central portion of the interior of the shell 10 near the top thereof. This cover plate has a pair of downwardly depending sides 20 which cooperate with the corresponding shell side walls 12 and 14 to define a pair of first step brine reservoirs 22a. The bottoms of these brine reservoirs are formed by a pair of first step orifice plates 24a which lie horizontally across the spaces between the sides 20 of the cover plate 18 and the corresponding side walls 12 and 14 of the outer shell 10.

A pair of inlet pipes 26 are provided to supply heated brine to be desalinized from an external source (not shown), to the first step brine reservoirs 22a.

The first step orifice plates 24a are provided with orifices 28 through which the brine may flow. Immediately under each of the plates 24a there is maintained a mass of packing material 30 which is held in place by a wire mesh or screen 32. This packing material is porous and permits liquid and vapors to flow downwardly through it. It serves, however, to prevent violet foaming effects which tend to occur as the brine passes through the orifices 28.

Immediately below each mass of packing material 30 there is provided a first step vapor recovery zone 34a; and below that is provided a second step brine reservoir 22b. These regions are bound laterally by the side walls 12 and 14 of the outer shell 10 and by side walls 36a of a first step nozzle plate 38a. The nozzle plate 38a is of the same general configuration as the cover plate 18 except that the nozzle plate 38a is formed with a first step nozzle 40a along its center. The nozzle plate 38a is partially nested within the cover plate 18 and cooperates with the cover plate 18 to form first step vapor separating conduits 42a which extend from the first step vapor recovery zones 34a to the centrally located first step nozzle 40a.

A pair of second step orifice plates 24b, similar to the first step orifice plates 24a, extend respectively between the two outer shell walls 12 and 14 and the side walls 36 of the first step nozzle plate 38a. These second step orifice plates, which define the bottom of the second step brine reservoir 22b are also provided with orifices 28 through which brine may flow. Also, there is maintained a mass of packing material 30 under each of these second step orifice plates 24b.

Below the packing material 30 under each second step orifice plate 24b, there is formed a second step vapor recovery zone 34b; and below that, a third step brine reservoir 22c.

A second step nozzle plate 38b, having a central second step nozzle opening 40b, and side walls 36b is arranged just under and in partially nested relationship with the first step nozzle plate 38a. The side walls 36b of the second step nozzle plate 38b cooperate with the side walls 36a of the first step nozzle plate 38a to form second step vapor separating conduits 42b which extend from the second step vapor recovery zones 34b to the centrally located second step nozzle 40b.

In the same manner, there are provided third, fourth and fifth step brine reservoirs 22c–e, orifice plates 24c–e, vapor recovery zones 34c–e, nozzles plates 38c–e and vapor separating conduits 42c–e.

The third and fourth step nozzle plates 38c and d are provided with associated central nozzle openings 40c and d. The fifth step nozzle plate 38e, however, is provided with a central diffusor opening 50 which opens into a downwardly extending outwardly flaring diffusor 52.

Below the fifth step vapor recovery zones 34e there are provided brine recovery channels 54 and 56 which collect unevaporated brine from the fifth veporization step. The recovery channels 54 direct this brine to channels 56 which in turn directs the brine to a successive vaporization stage or, in the event there are none, to a discharge conduit (not shown).

The vapor which passes down through the central diffusor opening 50, is caused by the diffusor 52 to undergo an energy conversion whereby its high kinetic energy of flow is converted to thermodynamic energy of pressure and temperature.

It will be appreciated that the various orifice plates 24 and the vapor recovery zones 34 constitute a series of evaporator cells which define a first flow path down through which brine may flow. Similarly the nozzle plates 38 constitute a series of vapor mixing cells interconnected by the nozzles 40 to define a second separate flow path down through which vapors may flow. The evaporator cells and mixing chambers are interconnected by the vapor separating conduits 42.

In operation of the above described system, brine which has been heated to its saturation temperature is supplied via the inlet conduits to the first stage liquid reservoirs 22a. The heated brine then passes through the orifice 28 in the first stage orifice plates 24a and flows down through the mass of packing material 30 and the first step vapor recovery zones 34a into the second step liquid reservoirs 22b.

The pressure within the first step vapor recovery zones 34a is maintained differentially below that in the first step liquid reservoirs so that as the brine flows through the orifices 28 a portion of it evaporates. The heat required for this evaporation is taken from the unevaporated portion of the brine; and as a consequence it becomes reduced in temperature as it passes into the second step liquid reservoirs 22b.

The liquid brine in the second step reservoirs 22b flows down through the orifices 28 in the second step orifice plates 24b and passes down through the packing material 30, and the second step vapor recovery zones 34b into the third step liquid reservoirs 22c. The pressure in the second step vapor recovery zones 34b in turn is maintained differentially below that in the second step liquid reservoirs 22b. Thus, further evaporation and a further temperature depression occurs in these zones. This evaporation process continues down through each of the steps in the system.

The vapors in each vapor recovery zone 34a–f pass upwardly through their respective vapor separating conduits 42a–f. These conduits, it will be noted, are large relative to their associated vapor recovery zone. As a result, the lineal velocity of the vapors through the vapors separating conduits 42a–f is quite low. This permits liquid droplets associated with the vapors to fall back down to the liquid reservoirs 22. Thus, the vapors are substantially separated from the evaporated liquid by the time they reach the nozzle openings 40a–e.

The nozzle openings 40a–e, it will be noted, communicate between vapor separating conduits of successively lower pressure. Accordingly, the vapors pass through the nozzle openings in the direction of lower pressure. The nozzle openings are specially shaped to convert the thermodynamic energy of the vapors in a higher step to kinetic energy of high velocity flow in a lower step. Thus, the vapors are allowed to expand during their passage through the nozzle openings; and this expansion is controlled by the nozzle configuration so that it is converted to a high velocity flow in a downward direction.

The rapid rush of vapors down through the center of each of the vapor separating conduits 42a–f produces an aspirating effect whereby the slowly moving vapors in each conduit are drawn in with the rapidly moving vapors and are caused to move down through the next successive nozzle in the system. Thus, more and more vapors are caused to flow down through lower and lower steps and in doing so they attain higher and higher velocities.

The mixing of the vapors in each step takes place by design in accordance with the principle of conservation of momentum which not only insures that the mixing process proceeds with minimum energy losses, but equally insures that after mixing, pressure and temperature are also equalized.

The mixing process, it will be appreciated, is associated with a certain amount of energy losses. However, theory shows that the loss is a minimum when the mixing proceeds with conservation of momentum. Also, the loss is smaller when the mass of the stream being taken along is small with respect to the mass of the stream taking it and when the inlet velocity of the latter is large.

The largest ratio of these vapor masses occurs at the discharge of the first nozzle. There the two masses are the same. The ratio then decreases towards the last nozzle. Since these losses affect the overall efficiency of the utilization of the flash energy and in order to maximize this efficiency, it may become desirable to increase the vapor velocities entering the respective nozzle system above that existing in the interconnecting channels. This requires an expansion of the vapor from the area of the interconnecting channel to a smaller entering area into the nozzle system. Such an expansion can only take place at the expense of pressure, that is at a reduction of the vapor temperatures in the nozzle system.

When the vapors reach the diffusor opening 50, they are directed thereby into the diffusor 52 where, because of gradually increasing flow areas, vapor velocities are reduced and its kintic energy is changed into pressure energy and correspondingly increased temperature. Accordingly, the vapors are more easily condensed by a common fixed sized condenser supplied by a fixed quantity of cooling water at a fixed temperature.

FIG. 3 shows an arrangement for multistaging the multistep evaporation unit shown in FIGS. 1 and 2. In the multistaging arrangement there are provided several multistep evaporators 60, 62, 64 and 66. The evaporators 60 and 64 are arranged in vertical alignment and are paralleled by the evaporators 62 and 66, also arranged in vertical alignment. The upper evaporators 60 and 62 are separated from the lower evaporators 64 and 66 by common condenser regions 70 in which are located banks of condenser tubes 72. The vapors pass down through diffusors 50 and are converted thereby to higher pressures and tempeartures, and admitted at low velocity into the condenser regions 70. These vapors then contact the condenser tubes 72 and are converted thereby to liquid form. The resulting liquid condensate drips into a fresh water reservoir 74 and is then collected via various conduit means (not shown).

The unevaporated liquid from the upper evaporators 60 and 62 passes directly from their brine recovery channels 54 and 56, down to the brine inlet pipes 26 at the top of the lower evaporators 64 and 66. The evaporation process is then repeated at lower conditions of pressure and temperature.

It will be appreciated that the idea dividing the downwardly flowing fluids into two separate streams as above described permits very great flexibility in design. Thus, the nozzle sizes can be established to optimize the mixing process without adversely affecting the evaporation process. Conversely, the temperature gradient down through the evaporator cells can be set to obtain maximum efficiency without adversely affecting the nozzle function.

The number of stages may be increased as desired. The multistep arrangement, however, permits the use of a fewer number of stages for a given overall temperature differential since it permits a single stage to handle flash type evaporation over a greater temperature range without incurring the turbulence problems associated with conventional flash evaporation.

By reducing the number of stages in a system, the present invention reduces the number of separate condensers and associated equipment required. Also, by virtue of the diffusor arrangement used in the present invention, the effectiveness of the condenser itself is increased since it is enabled to extract more heat energy out of the vapors to be condensed.

It will be appreciated that in the arrangement of the present invention a common condenser unit may be used to condense the vapors which are formed in several steps at various conditions of pressure and temperature. This is achieved by reducing the pressure and temperature of the vapors in the higher steps and by causing such reduction to take place via a nozzle so that the energy is not wasted but is preserved in the form of high velocity flow.

It will be appreciated that the system of the present invention achieves its advantageous results, in part, by causing expansion to occur separate from and at a location remote from actual vaporization. In prior systems the vapors expanded in one step as they were formed, and this expansion, because it took place adjacent to the liquid from which the vapor came, inevitably caused a tearing away of liquid particles which contaminated the vapors upon subsequent condensation. In the present invention the vaporization takes place through the nozzle openings remote from the liquid brine.

An experimental unit configured in accordance with the drawings herein, was built and operated in order to demonstrate the feasibility of the present invention. This unit was designed to accommodate a 6 gal./minute brine flow and the flash evaporate this brine from 105° down to 90° F. in five stages. By virtue of the diffusor arrangement the temperature of the vapors was raised to 94° F. for entry into the condenser region.

The unit tested had an overall height of about 17 inches, a width of about 10½ inches and a depth of about 4 inches. The various other dimensions and operating conditions for the different steps are given in Table I.

TABLE I

| Step | Pressure, p.s.i.a. | Temp., °F. | Vapor flow rate, lb./sec.×10⁻³ | Vapor velocity, ft./sec. | Dimension "A", in. | Dimension "B", in. | Dimension "C", in. | Dimension "D", in. | Dimension "E", in. |
|---|---|---|---|---|---|---|---|---|---|
| 1 | 1.038 | 102.9 | 1.63 | 25 | 0.054 | 0.50 | 0.50 | 0.50 | 2.0 |
| 2 | 0.949 | 100 | 2.24 | 37.7 | 0.127 | 1.25 | 0.75 | 0.50 | 2.0 |
| 3 | 0.867 | 96.9 | 2.58 | 47.5 | 0.206 | 1.25 | 0.75 | 0.50 | 2.0 |
| 4 | 0.779 | 93.5 | 2.63 | 54.25 | 0.250 | 1.25 | 0.75 | 0.50 | 2.0 |
| 5 | 0.698 | 90 | 2.70 | 60.5 | 0.500 | 0.813 | 0.37 | 0.50 | 2.0 |

Dimensions "F" and "G" were 10 inches and 2.5 inches, respectively. The dimensions may, of course, be adjusted in accordance with the flow rate, the flash temperature range and the number of steps employed.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. Apparatus for combining vapors comprising a plurality of chambers for containing vapors, means associated with said chambers for maintaining the vapors in said chambers at different conditions of pressure and temperature, said chambers being arranged in series according to an order of successively descending interior pressure and temperatures, and expansion nozzle means interconnecting adjacent chambers in said series whereby vapors of higher pressure and temperature will expand and pass at high velocity from one chamber into the next and combine with the vapors in said next chamber and the combined vapors expand and pass at high velocity from said next chamber into another chamber and so on, each of said expansion nozzle means being in mutual alignment and increased in size from nozzle to nozzle.

2. Apparatus for condensing vapors comprising a plurality of chambers for containing vapors, means associated with said chambers for maintaining the vapors in said chambers at different conditions of pressure and temperature, said chambers being arranged in series according to an order of successively decreasing interior pressures and temperatures, expansion nozzle means interconnecting adjacent chambers in said series whereby vapors of higher pressure and temperature will expand and pass at high velocity from one chamber into the next and combine with the vapors in said next chamber and the combined vapors expand and pass at high velocity from said next chamber into another chamber and so on, and condenser means connected to the last chamber in the series to receive and condense the combined vapors, each of said expansion nozzle means being in mutual alignment and increased in size from nozzle to nozzle.

3. Apparatus according to claim 2 further including diffuser means arranged in the path of vapor flow into said condenser means to convert the vapor flow velocity to pressure in said condenser.

4. Apparatus for recovering selected vapors from a solution, said apparatus comprising a plurality of evaporator cells, means defining a first flow path constituted by said evaporator cells arranged in series to permit liquid to be evaporated to pass serially therethrough, means for maintaining said cells at successively decreasing pressures and temperatures whereby vapors are formed from said liquid at different pressures and temperatures in said cells, means defining a plurality of vapor chambers each communicating with an associated one of said evaporator cells to receive the vapors produced therein, expansion nozzle means interconnecting adjacent ones of said vapor chambers to permit vapors of higher pressure and temperature to expand and pass at high velocity from one chamber into the next and combine with the vapors in the next chamber and further to permit the combined vapors from said next chamber to expand and pass at high velocity from said next chamber into another and so on, and condenser means connected to the chamber of lowest pressure and temperature to receive and condense all of the combined vapors, each of said expansion nozzle means being in mutual alignment and increased in size from nozzle to nozzle.

5. In a multistage evaporative recovery system the combination of means defining two separate flow paths, one of said flow paths being constituted by a series of evaporator cells arranged to be maintained at successively lower pressures and interconnected to permit liquid to be evaporated to flow serially therethrough, said evaporator cells being arranged in vertical alignment, a common condenser below said evaporator cells, means defining a common vapor recovery flow passage constituted by a series of vapor mixing chambers communicating with the evaporators and disposed centrally and between the evaporators with expansion nozzle means of progressively increasing diameter from the upper to the lower evaporators for passing the vapor downwardly in the common flow passage to the condenser.

6. Apparatus for combing vapors comprising a plurality of chambers for containing vapors, means associated with said chambers for maintaining the vapors in said chambers at different condition of pressure and temperature, said chambers being arranged in series according to an order of successively descending interior pressure and temperatures, and expansion nozzle means interconnecting adjacent chambers in said series whereby vapors of higher pressure and temperature will expand and pass at high velocity from one chamber into the next and combine with the vapors in said next chamber and the combined vapors expand and pass at high velocity from said next chamber into another chamber and so on, said expansion nozzle means being closely positioned from chamber to chamber and aligned to direct the vapors from said one chamber at high velocity against the vapors in said next chamber thereby effecting a kinetic energy transfer to the vapors in said next chamber to cause said vapors in said next chamber to move at high velocity together with the vapors from said one chamber through the next adjacent nozzle means.

References Cited

UNITED STATES PATENTS

| | | | |
|---|---|---|---|
| 1,996,526 | 4/1935 | Serpas | 159—18X |
| 2,658,029 | 11/1953 | Untermann | 202—173X |
| 2,894,879 | 7/1959 | Hickman | 203—27 |
| 3,194,747 | 7/1965 | Ris et al. | 202—173 |
| 3,214,349 | 10/1965 | Kehoe et al. | 203—11 |
| 3,233,879 | 2/1966 | Mitchell | 202—236X |
| 3,298,932 | 1/1967 | Bauer | 203—11 |
| 3,342,697 | 9/1967 | Hammond | 202—173 |
| 1,483,990 | 2/1924 | Schmidt | 62—270 |
| 1,783,464 | 12/1930 | Follain | 62—270X |
| 2,026,233 | 12/1935 | Kirgan | 62—270 |
| 2,168,875 | 8/1939 | Noll | 202—173UX |
| 2,908,618 | 10/1959 | Bethon | 62—174 |
| 3,180,805 | 4/1965 | Chirico | 62—173 |
| 3,216,910 | 11/1965 | Langer et al. | 62—173 |
| 3,249,517 | 5/1966 | Lockman | 62—159 |

OTHER REFERENCES

The Inst. of Mechanical Engineers—Flash Evaporators for the Distillation of Sea-Water, by Frankel, pp. 3–9.

NORMAN YUDKOFF, Primary Examiner

F. E. DRUMMOND, Assistant Examiner

U.S. Cl. X.R.

202—182; 203—11, 88